UNITED STATES PATENT OFFICE.

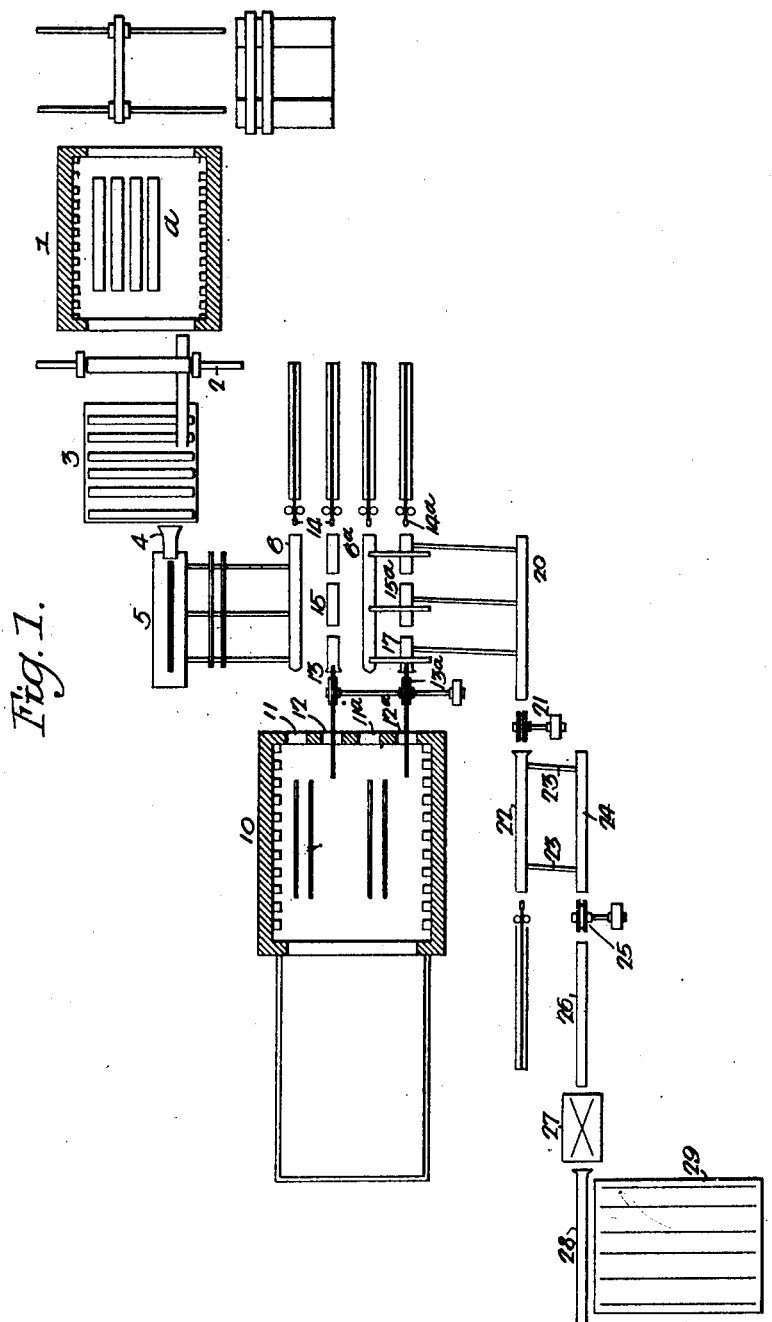

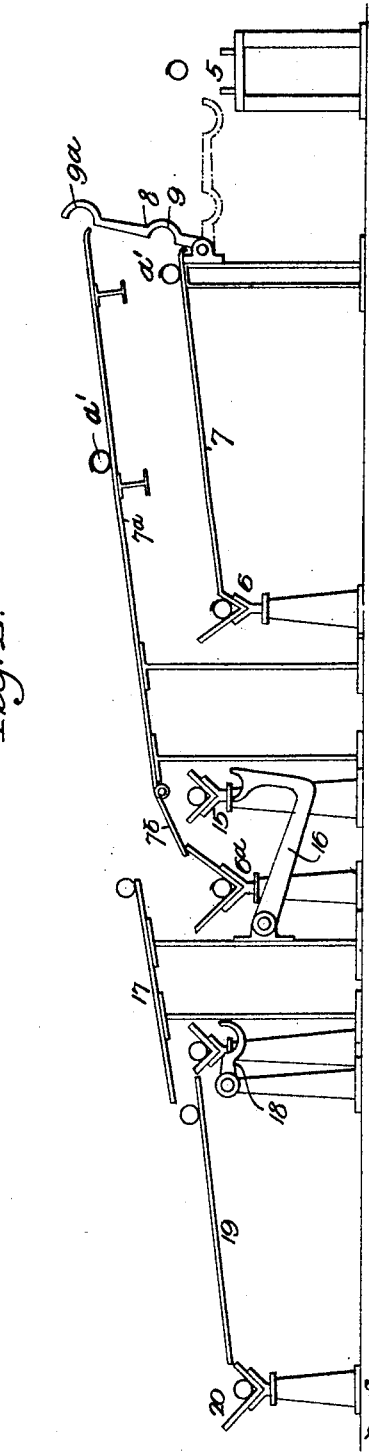

JAMES H. MATHESON, OF READING, PENNSYLVANIA.

APPARATUS FOR MAKING LAPWELDED TUBES.

1,367,413.  Specification of Letters Patent.  Patented Feb. 1, 1921.

Application filed April 6, 1920. Serial No. 371,575.

*To all whom it may concern:*

Be it known that I, JAMES H. MATHESON, a citizen of the United States, residing in Reading, Berks county, Pennsylvania, have invented certain Improvements in Apparatus for Making Lapwelded Tubes, of which the following is a specification.

The object of this invention is to increase the production of a tube mill by so designing the apparatus that two sets of tubes can be manipulated and heated at the same time in a single furnace.

In the accompanying drawings:

Figure 1. is a diagrammatic plan view showing the furnace and apparatus for carrying out my invention, and Fig. 2, is a view in elevation showing the method of handling the tubes as they pass through the different stages in the process of manufacture.

1 is a primary heating furnace for the plates $a$, which are passed into the rear of the furnace, and then projected from the front through scarfing rolls 2 and onto a table 3. This furnace is an ordinary regenerative furnace used in tube mills, and shown in diagram.

The plates are then passed through the bending die 4 so as to shape them into the form of a tube skelp with the scarfed edges overlapping. They are then transferred from a table 5 to the two troughs 6, $6^a$, which receive the skelps from the inclined ways 7, $7^a$. The way $7^a$ is located above the way 7, and extends to the trough $6^a$. In order to transfer the tubes from the table 5 to these ways, I provide a pivoted carrier 8, having two recesses 9, $9^a$.

As the skelps are passed through the bending die, they are transferred by hand to the carrier, one tube resting in the recess 9, and the other in the recess $9^a$, and when this carrier is raised, as shown in Fig. 2, the two tubes $a'$ are transferred onto the inclined ways 7, $7^a$, and roll down to their respective troughs 6, $6^a$. The skelps may be handled singly or in pairs. The troughs 6, $6^a$, are in line with openings 11, $11^a$ respectively in the front of a furnace 10 of the ordinary generative type in which the tube skelps are heated, and the furnace is so designed that several skelps can remain in the furnace until they are heated to the proper degree. Then they are passed out through openings 12, $12^a$ in the front of the furnace, and between welding rolls 13, $13^a$, driven in the ordinary manner, and over the balls 14, $14^a$, which are projected so as to be in proper position in respect to the welding rolls 13, $13^a$.

The welded tubes after passing between the rolls 13, $13^a$, are delivered onto troughs 15 $15^a$, which are made up of disconnected sections, as shown in the present instance, and the tubes in the troughs 15 are picked up by levers 16 shaped as shown which discharge the tubes onto the inclined way 17. The guide bars $7^b$ at the end of the ways 7 are hinged to allow the tubes to pass. The tubes in the trough $15^a$ are raised by levers 18 and discharged onto the inclined way 19, and as the way 17 overlaps this way 19, the tubes from the trough 15 drop onto this way 19, and the tubes from both troughs roll down the inclined way 19 into the trough 20, which is in front of the finishing rolls 21. One tube after another is passed through these finishing rolls into a trough 22, and then carried laterally over ways 23 to a trough 24 in front of the final finishing and sizing rolls 25. The tubes pass between these rolls and into a trough 26, then through ordinary cross rolls 27 to a trough 28, and then onto the cooling table 29.

I have shown the mechanism in diagram, and the carrier 8 and the levers 16 and 18 may be connected with any power driving mechanism, which mechanism may be actuated through hydraulic or air cylinders or through mechanical or electrical mechanism without departing from the essential features of the invention.

By the above construction and arrangement of parts, it will be seen that I can increase the output of an ordinary tube mill by arranging the parts as indicated and providing a single furnace for heating two sets of tube skelps.

I claim:

1. The combination of a heating furnace having two charging openings at one end of the furnace and two withdrawal openings alternating with the charging openings; welding rolls in line with the withdrawal openings and troughs in line with the welding rolls; a single table for receiving the tube skelps; and means for delivering the tubes from the table to a position in line with the two charging openings of the furnace.

2. The combination, in apparatus for welding tubes, of a furnace having two charging openings spaced apart and two withdrawal openings alternating with the charging openings; a trough in line with each of said openings; welding rolls in line with the withdrawal openings; a table for receiving the tube skelps; two ways, one leading to the trough in line with one charging opening and the other leading to the trough in line with the other charging opening; a carrier for transferring the tube skelps onto the two ways so that they will roll into their respective troughs and can be introduced into the furnace through the charging openings; and means for removing the welded tubes.

3. The combination, in apparatus for welding tubes, of a furnace having two charging openings and two withdrawal openings at the same end of the furnace; a trough in line with each opening; welding rolls in line with each withdrawal opening; means for scarfing the blank and bending it into the form of a tube skelp; two ways one above the other, one leading to the trough in line with one charging opening and the other leading to the trough in line with the other charging opening; a carrier arranged to transfer the tubes onto the two ways; lever mechanism at each trough in line with the two withdrawal openings; two inclined ways, one inclined way leading from one trough; a trough in front of the finishing rolls arranged to receive the tubes from the inclined way, and the other inclined way extending over one of the receiving troughs and directing the welded tube onto the other discharge inclined way so that both tubes will roll to a position in line with the finishing rolls.

4. The combination of a heating furnace having two charging openings and two withdrawal openings, welding rolls in line with the withdrawal openings, a trough in line with each opening; means for directing tube skelps to the troughs in front of the charging opening, and lever mechanism for lifting the welded tubes out of their troughs and inclined ways onto which the tubes are discharged and a trough arranged to receive the tubes from said ways.

JAMES H. MATHESON.